(12) United States Patent
Nakayama et al.

(10) Patent No.: US 9,417,682 B2
(45) Date of Patent: Aug. 16, 2016

(54) DISPLAY UNIT DRIVING DEVICE WITH REDUCED POWER CONSUMPTION

(71) Applicant: LAPIS Semiconductor Co., Ltd., Yokohama (JP)

(72) Inventors: Akira Nakayama, Yokohama (JP); Hideaki Hasegawa, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 5 days.

(21) Appl. No.: 14/549,038

(22) Filed: Nov. 20, 2014

(65) Prior Publication Data

US 2015/0138261 A1 May 21, 2015

(30) Foreign Application Priority Data

Nov. 21, 2013 (JP) .................................. 2013-241071

(51) Int. Cl.
*G09G 3/20* (2006.01)
*G09G 3/36* (2006.01)
*G06F 1/32* (2006.01)

(52) U.S. Cl.
CPC ............ *G06F 1/3265* (2013.01); *G06F 1/3218* (2013.01); *G09G 3/2092* (2013.01); *G09G 3/3666* (2013.01); *G09G 3/3685* (2013.01); *G09G 2310/0202* (2013.01); *G09G 2310/0213* (2013.01); *G09G 2310/0278* (2013.01); *G09G 2310/04* (2013.01); *G09G 2310/08* (2013.01); *G09G 2320/0626* (2013.01); *G09G 2320/10* (2013.01); *G09G 2330/021* (2013.01); *G09G 2340/0435* (2013.01); *G09G 2370/04* (2013.01); *Y02B 60/1242* (2013.01); *Y02B 60/32* (2013.01)

(58) Field of Classification Search
CPC ... G09G 3/3696; G09G 5/008; G09G 3/2011; G09G 3/2927
See application file for complete search history.

(56) References Cited

U.S. PATENT DOCUMENTS

| 6,411,273 B1* | 6/2002 | Nakamura | G09G 3/2011 345/98 |
| 2014/0015865 A1* | 1/2014 | Kim | G09G 5/10 345/690 |
| 2014/0204064 A1* | 7/2014 | Chen | G09G 5/18 345/204 |

FOREIGN PATENT DOCUMENTS

JP 2006-184357 A 7/2006

* cited by examiner

*Primary Examiner* — Kevin M Nguyen
(74) *Attorney, Agent, or Firm* — Rabin & Berdo, P.C.

(57) ABSTRACT

A driving device for driving a display unit which can reduce power consumption regardless of the type of video data is provided which, based on the type of application software which is the provider of a video data signal, performs either one of a first power saving mode in which to stop power delivery to a data driver and a second power saving mode in which the data driver stops importing of the pixel data sequence signal when the 1-H line data's respectively corresponding to neighboring ones of horizontal scan lines of the display unit coincide with each other.

8 Claims, 12 Drawing Sheets

FIG. 4

| AP IDENTIFICATION INFO | ATTRIBUTE |
|---|---|
| AP1 | MOVING IMAGES |
| AP2 | STILL IMAGES |
| AP3 | STILL IMAGES |
| AP4 | MOVING IMAGES |
| ... | ... |

FIG. 12

| AP IDENTIFICATION INFO | ATTRIBUTE | | |
|---|---|---|---|
| | 13a | 13b | 13c |
| AP1 | MOVING IMAGES | MOVING IMAGES | MOVING IMAGES |
| AP2 | STILL IMAGES | MOVING IMAGES | STILL IMAGES |
| AP3 | MOVING IMAGES | STILL IMAGES | STILL IMAGES |
| ... | ... | ... | ... |

DISPLAY UNIT DRIVING DEVICE WITH REDUCED POWER CONSUMPTION

BACKGROUND OF THE INVENTION

1. Field of the Invention

The present invention relates to a driving device for driving a display unit by supplying a video signal thereto, which displays an image, corresponding to the video signal.

2. Description of the Related Art

A portable communication terminal, which may be either one of portable telephones, smartphones, tablet computers, notebook computers, navigation devices, and portable game machines, is nowadays popular and usually includes a display unit, such as a liquid crystal display panel or an organic electro-luminescence (EL) unit. The portable communication terminal employs either one of various kinds of power saving technologies in order to reserve continuous operation time of batteries. As one of the power-saving technologies, an image input processing method has been proposed (see, for example, Japanese Patent Application Laid-Open No. 2006-184357). The method includes: determining whether an input image is a moving image or a still image on the basis of inputted frame-based video data; and inhibiting the inputted video data of a current frame from being supplied to a frame memory if the input image is a still image so as to reduce power consumption.

However, some of application software programs that provide video data deal mainly with moving images, and hence, when video data is supplied by such an application software program, the above image input processing method cannot produce the effect of saving power.

SUMMARY OF THE INVENTION

An object of the present invention is to provide a driving device for driving a display unit that can reduce power consumption regardless of the type of video data.

According to the present invention, there is provided a driving device for driving a display unit which causes the display unit to display on its screen an image based on a video data signal, comprising a drive controller that generates a pixel data sequence signal formed of a sequence of respective pixel data corresponding to luminance levels of pixels in accordance with the video data signal; and a data driver that imports the pixel data sequence signal and applies pixel drive voltages corresponding to the luminance levels denoted by the respective pixel data to data lines of the display unit. The pixel data sequence signal consisting of a series of frame data pieces each of which includes m (m is a natural number of 2 or more) pieces of 1-H line data respectively corresponding to m horizontal scan lines. The drive controller comprises a determining part that determines whether application software which is the provider of the video data signal is either a piece of software providing still images or a piece of software providing moving images (i.e., images including moving-image areas) and, based on the determining result of the determining part, performs one of a first power saving mode in which power delivery to the data driver is stopped and a second power saving mode in which the data driver stops importing of the pixel data sequence signal when the pieces of the 1-H line data respectively corresponding to neighboring ones of horizontal scan lines of the display unit coincide with each other.

BRIEF DESCRIPTION OF THE DRAWINGS

FIG. 4 is a diagram illustrating the contents stored predetermined in an AP attribute memory 11$a$;

FIG. 12 is a diagram illustrating the contents stored predetermined in an AP attribute memory 11$c$.

DETAILED DESCRIPTION OF THE PREFERRED EMBODIMENT

Hereinbelow, embodiments of the present invention will be described in detail while referring to the accompanying drawings.

Figure 1:
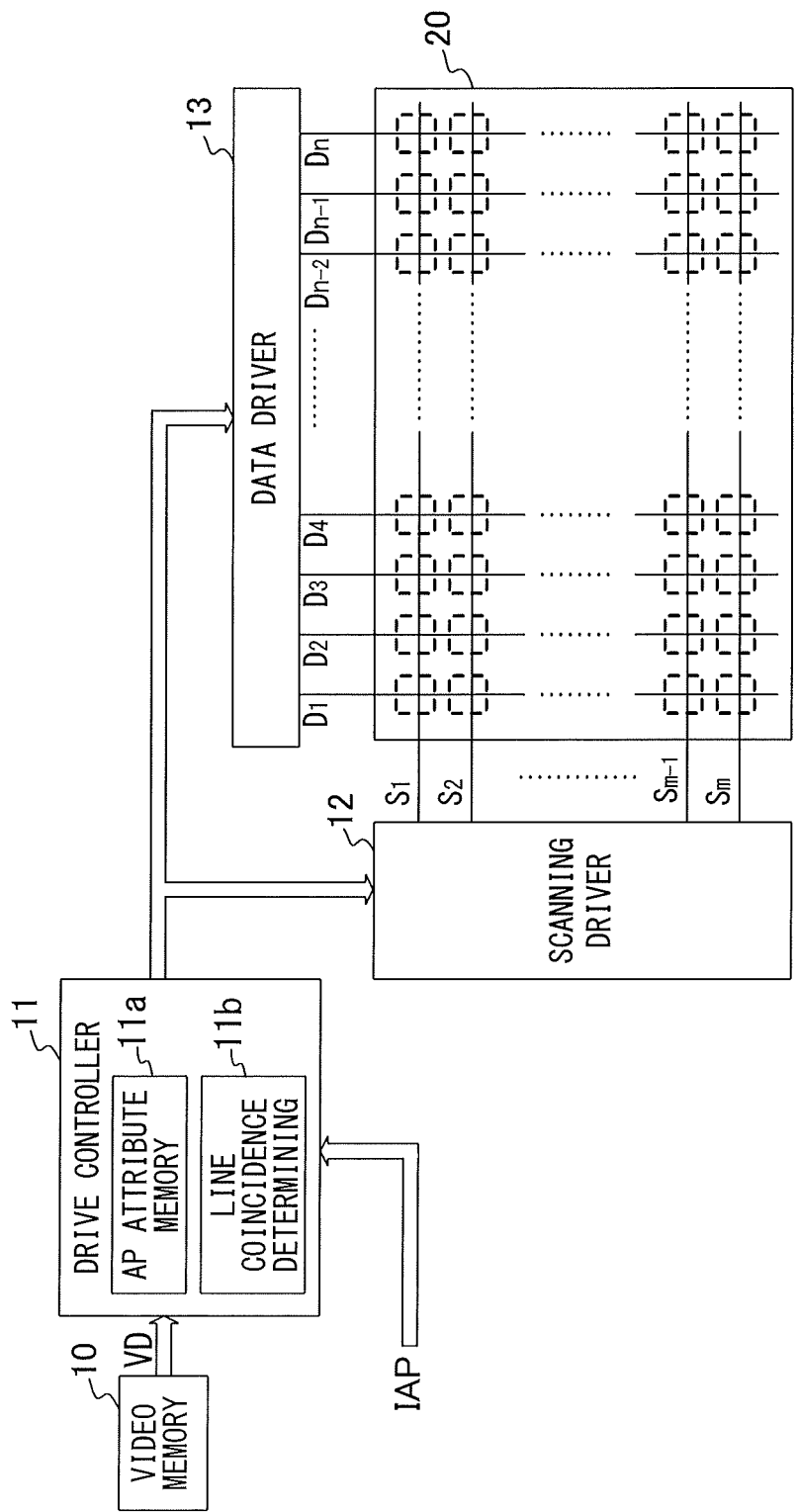
FIG. 1 is a block diagram illustrating a display apparatus including a driving device according to the present invention.

FIG. 1 is a schematic configuration view illustrating a driving device for driving a display unit according to the present invention. As illustrated in FIG. 1, the display apparatus includes a video memory 10, a drive controller 11, a scanning driver 12, a data driver 13, and a liquid crystal or organic EL display unit 20.

The display unit 20 has m (m is a natural number of 2 or more) horizontal scan lines $S_1$ to $S_m$ formed to extend in a horizontal direction on a two-dimensional screen and n (n is a natural number of 2 or more) data lines $D_1$ to $D_n$ formed to extend in a vertical direction on the two-dimensional screen. Display cells carrying pixels are respectively formed at intersection areas between the horizontal scan lines and the data lines, i.e., in the areas encircled by rectangular broken lines in FIG. 1.

The video memory 10 stores video data signals provided by a variety of video-providing application software (hereinafter called AP) or video data signals obtained through reception by a television tuner or the like. The video memory 10 reads out the stored video data signals, and supplies the data to the drive controller 11 as a video data signal VD.

Figure 2:
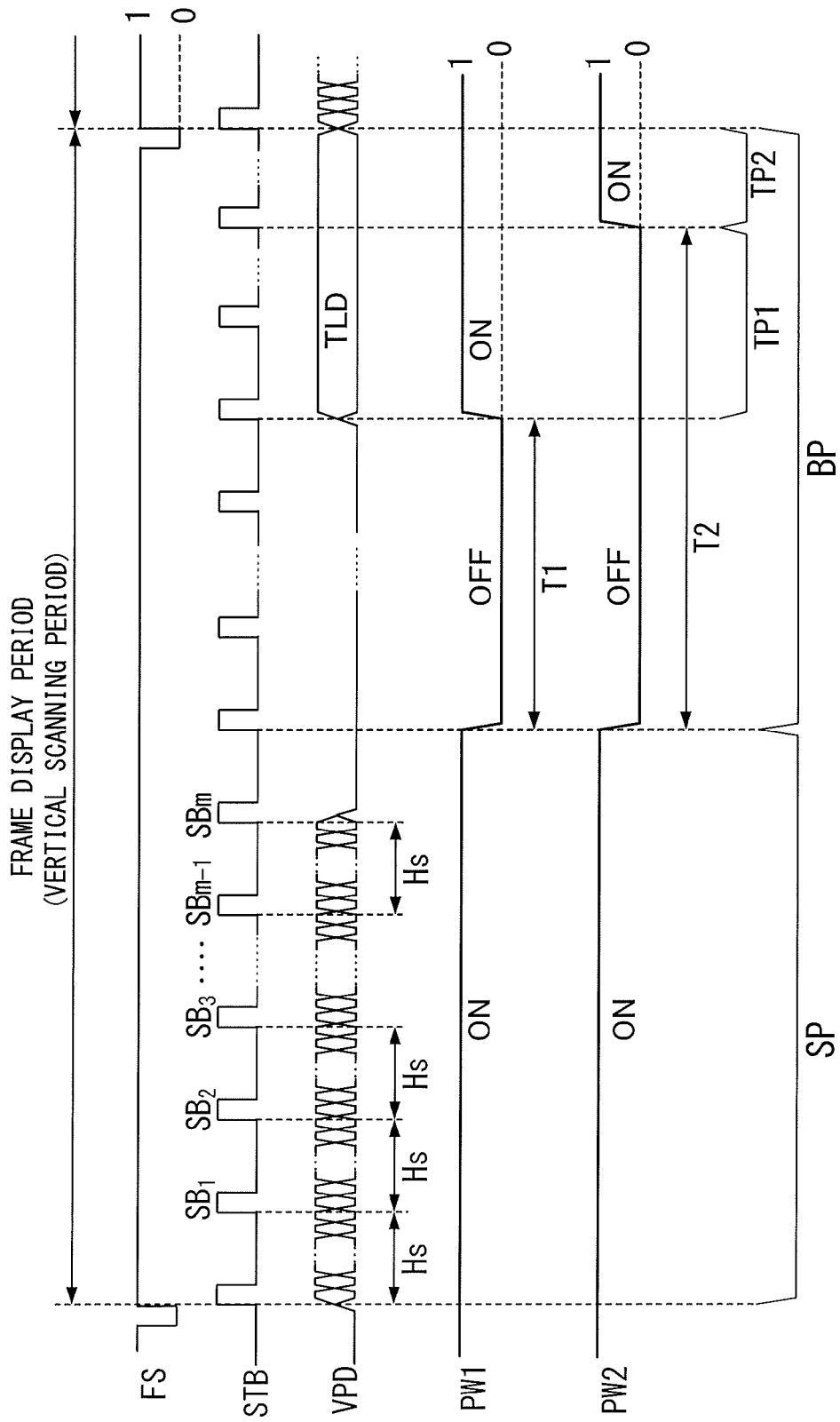
FIG. 2 is a time chart illustrating changes of signals generated by the driving device during a frame display period.

The drive controller 11 generates a sequence (line) of pixel data PD on the basis of the video data signal VD read out from the video memory 10. The sequence of pixel data PD indicates the luminance levels of the respective pixels with a bit string of, for example, 8 bits. A reference timing signal that indicates reference timing of a clock signal is superimposed on the sequence of pixel data PD to obtain pixel data sequence signals VPD. The pixel data sequence signals VPD are supplied to the data driver 13. Based on the video data signal VD, the drive controller 11 generates vertical sync signals FS that are synchronized with the frame of each image as illustrated in FIG. 2. The vertical sync signals FS are supplied to the data driver 13. The pixel data sequence signals VPD consist of a series of frame data pieces. A single frame data includes m pieces of 1-H line data which correspond respectively to the horizontal scan lines S1 to Sm. Each of the pieces of the 1-H line data consist of n pixel data PD.

As illustrated in FIG. 2, in response to the video data signal VD, the drive controller 11 generates a strobe signal STB which is formed of a sequence of strobe pulses SB indicating horizontal scanning timing for the display unit 20. The strobe signal STB is supplied to the scanning driver 12 and the data driver 13. Therefore, the cycle of the strobe pulses SB in the strobe signal STB is equal to a horizontal scanning cycle Hs of horizontal scanning pulses (described later) which are applied to drive the display unit 20. As illustrated in FIG. 2, in each frame display period (vertical scanning period), a period from supplying a first strobe pulse $SB_1$ corresponding to a scan line $S_1$ to supplying an m-th strobe pulse $SB_m$ corresponding to a scan line $S_m$ is defined as a data scanning period SP, and a subsequent period is defined as a blank period BP. In the data scanning period SP, the drive controller 11 generates power switch signals PW1 and PW2 of logic level 1 that is, for example, to assert continued power supply as illustrated in FIG. 2. The signals PW1 and PW2 are supplied to the data driver 13. When the data scanning period SP is switched to the blank period BP as illustrated in FIG. 2, the drive controller 11 supplies to the data driver 13 a power switch signal PW1 of logic level 0 that is, for example, to stop power supply for a predetermined power stop period T1 starting at the moment of switchover. The drive controller 11 then returns the power switch signal PW1 to the state of the logic level 1. When the data scanning period SP is switched to the blank period BP, the drive controller 11 supplies a power switch signal PW2 of logic level 0 to the data driver 13 to stop power supply for predetermined power stop period T2 (T2>T1) starting from the moment of switchover. The drive controller 11 then returns the power switch signal PW2 to the state of the logic level 1. As illustrated in FIG. 2, at the moment when the power stop period T1 has been lapsed after the start of the blank period BP, the drive controller 11 generates pixel data sequence signals VPD including a data sequence TLD for clock synchronization training, which is formed by superimposing the above-described reference timing signal on a dummy pixel data sequence. The generated pixel data sequence signals VPD are supplied to the data driver 13.

Figure 3:
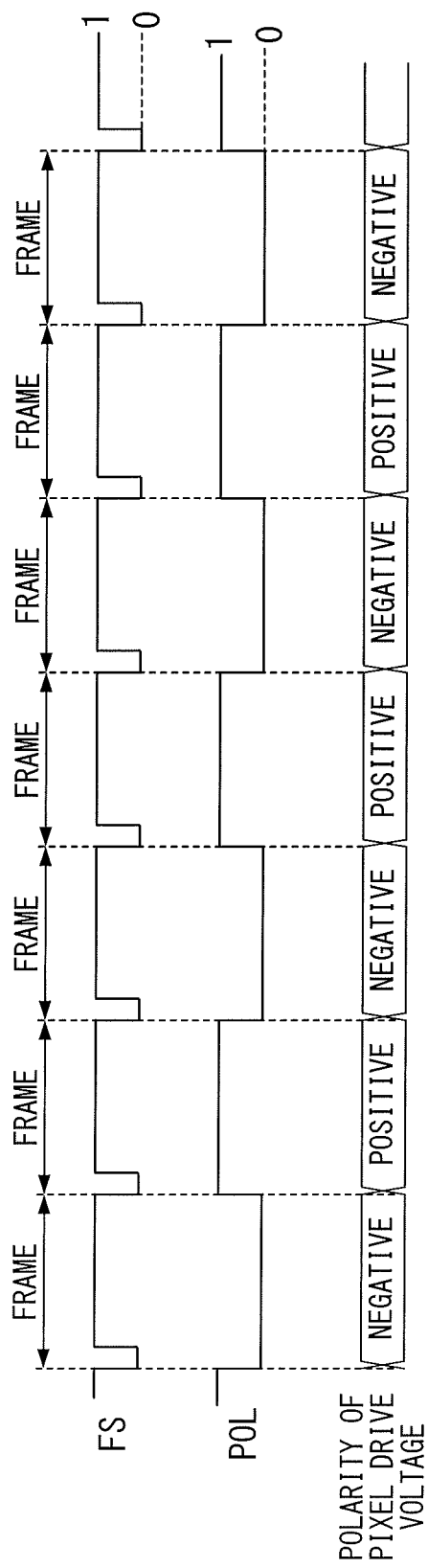
FIG. 3 is a time chart illustrating a changes of polarity switching signal POL.

The drive controller 11 also generates a polarity switching signal POL which switches the polarity of pixel drive voltages applied to the display unit 20, from positive polarity to negative polarity, or from negative polarity to positive polarity, for each frame as illustrated in FIG. 3 for example. The generated polarity switching signal POL is supplied to the data driver 13. For example, as illustrated in FIG. 3, the polarity of the pixel drive voltage switches from negative polarity to positive polarity or from positive polarity to negative polarity at the timing of a rising edge or a falling edge of the polarity switching signal POL.

The drive controller 11 comprises an AP attribute memory 11a and a line coincidence determining part 11b. In the AP attribute memory 11a, identification information such as a name or number identify each AP that can be the provider of the video data signal VD and attribute information indicating whether the AP is a piece of software providing still images or a piece of software providing moving images (i.e., images including moving-image areas) are stored in association with each other predetermined. The line coincidence determining part 11b determines whether the pieces of the 1-H line data respectively corresponding to vertically neighboring ones of the horizontal scan lines coincide with each other. An AP identification signal IAP to identify the AP that is the provider of the video data signal VD is supplied to the drive controller 11. That is, the CPU (Central Processing Unit) incorporated in, e.g., a mobile communication terminal having the display apparatus shown in FIG. 1, supplies the AP identification signal IAP to identify the AP, which the CPU is executing to acquire video data (VD), to the drive controller 11. The drive controller 11 performs control according to either a first power saving mode or a second power saving mode, described later, based on the AP identification signal IAP and the stored contents of the AP attribute memory 11a. In the first power saving mode, the drive controller 11 supplies an import stop signal LST having, e.g., the logic level of 1 to have it import the pixel data sequence signal VPD to the data driver 13. In the second power saving mode, the drive controller 11 supplies the import stop signal LST having, e.g., the logic level of 0 to have it stop importing of the pixel data sequence signal VPD to the data driver 13.

The scanning driver 12 generates horizontal scanning pulses having a predetermined peak voltage in synchronization with each strobe pulse in the strobe signal STB supplied from the drive controller 11. The scanning driver 12 sequentially applies the horizontal scanning pulses to each of the scan lines $S_1$ to $S_m$ of the display unit 20 in an alternative way.

Figure 5:
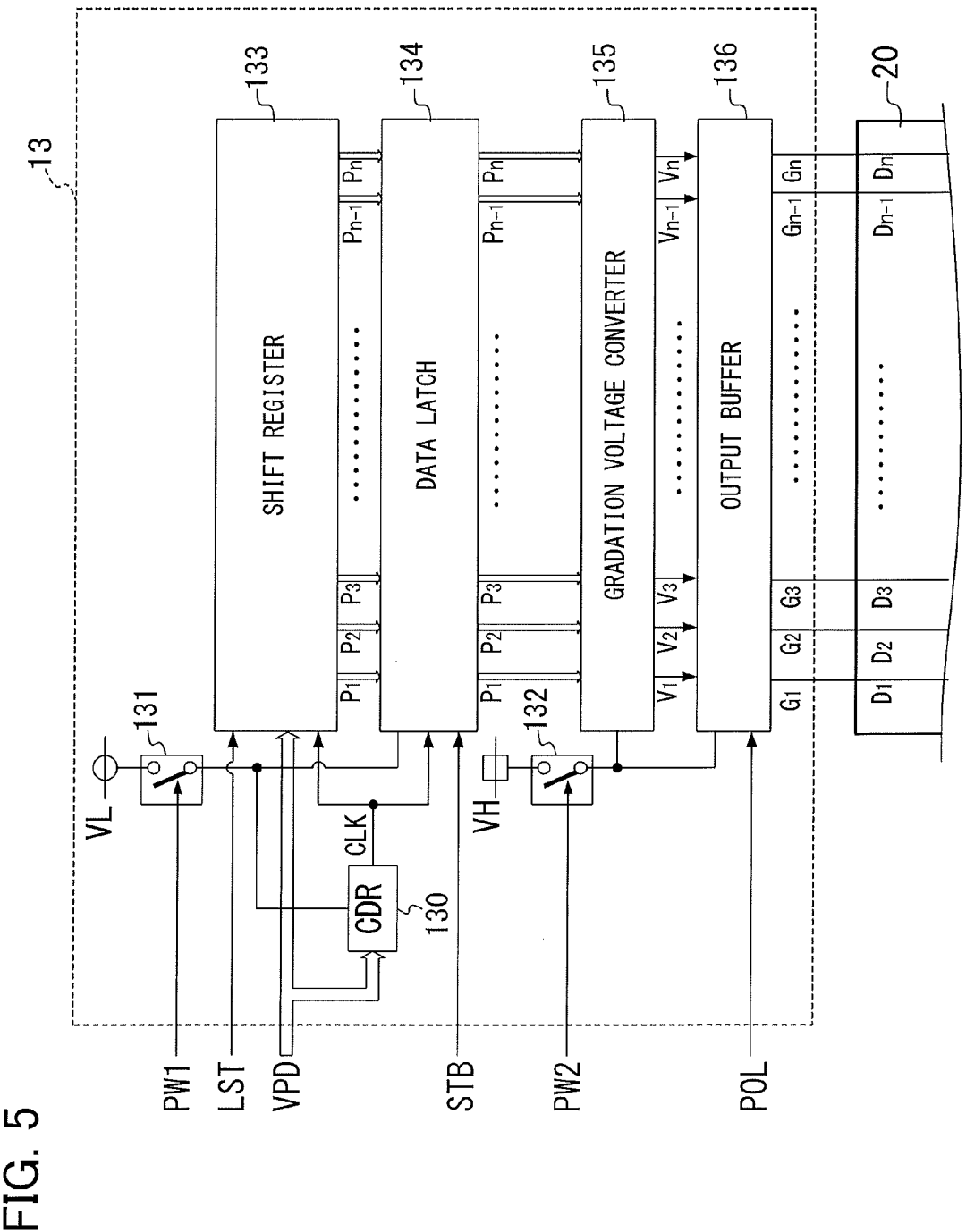
FIG. 5 is a block diagram illustrating the internal configuration of a data driver 13.

FIG. 5 is a block diagram illustrating the internal configuration of the data driver 13. As illustrated in FIG. 5, the data driver 13 includes a clock data recovery (hereinafter referred to as CDR) circuit 130, power switches 131 and 132, a shift register 133, a data latch 134, a gradation voltage converter 135, and an output buffer 136.

The CDR circuit 130 extracts the reference timing signal from the pixel data sequence signal VPD supplied from the drive controller 11. The CDR circuit 130 then generates a clock signal CLK in phase-synchronization with the reference timing signal, and supplies it to the shift register 133 and the data latch 134.

The power switch 131 is in an ON state while the power switch signal PW1 of logic level 1 that is, for example, to assert continued power supply is being supplied from the drive controller 11. Consequently, a source voltage VL for driving digital circuits is supplied to the CDR circuit 130 as well as to the shift register 133 and the data latch 134 which serve as a data taking unit. During this time, the CDR circuit 130, the shift register 133, and the data latch 134 are in an operable state in response to the supply of the source voltage VL. While the power switch signal PW1 of logic level 0 that is, for example, to stop power supply is being supplied, the power switch 131 is in an OFF state. Consequently, supply of the source voltage VL to the CDR circuit 130, the shift register 133, and the data latch 134 is stopped. During this time, the CDR circuit 130, the shift register 133, and the data latch 134 are in an operation stopped state.

The power switch 132 is in the ON state while the power switch signal PW2 of the logic level 1 that is, for example, to assert continued power supply is being supplied from the drive controller 11. Consequently, a source voltage VH for driving pixels is supplied to the gradation voltage converter 135 and the output buffer 136 which serve as a pixel drive voltage outputting unit. During this time, the gradation voltage converter 135 and the output buffer 136 are in the operable state in response to the supply of the source voltage VH. While the power switch signal PW2 of, for example, logic level 0 that is to stop power supply is being supplied, the power switch 132 is in the OFF state. Consequently, supply of the source voltage VH to the gradation voltage converter 135 and the output buffer 136 is stopped. During this time, the gradation voltage converter 135 and the output buffer 136 are in the operation stopped state.

While the import stop signal LST having the logic level of 1 is being supplied from the drive controller 11, the shift register 133 sequentially imports pixel data PD respectively corresponding to pixels at timings synchronous with the clock signal CLK out of the pixel data sequence signal VPD supplied from the drive controller 11. While the import stop signal LST having the logic level of 0 is being supplied from the drive controller 11, the shift register 133 stops importing of the pixel data sequence signal VPD. During this time, the preceding pixel data taken in immediately before stopping taking in the pixel data sequence signal VPD, is held in the shift register 133. Each time that one horizontal scan line worth (n number) of pixel data have been imported, the shift register 133 supplies the n number of pixel data PD as pixel data $P_1$ to $P_n$ to the data latch 134.

In response to the strobe signal STB illustrated in FIG. 2, the data latch 134 takes in the pixel data $P_1$ to $P_n$ supplied from the shift register 133 at a timing synchronized with the clock signal CLK, and supplies these data sets to the gradation voltage converter 135.

The gradation voltage converter 135 converts the pixel data $P_1$ to $P_n$ supplied from the data latch 134 into pixel drive voltages $V_1$ to $V_n$ that have voltage values corresponding to the luminance levels of the respective pixels, and supplies the pixel drive voltages $V_1$ to $V_n$ to the output buffer 136.

The output buffer 136 switches the polarity of the respective pixel drive voltages $V_1$ to $V_n$ from positive polarity to negative polarity or from negative polarity to positive polarity at an edge timing of the polarity switching signal POL supplied from the drive controller 11. The output buffer 136 switches the polarity of the pixel drive voltage in each pixel as described above and then amplifies each of the pixel drive voltages to a desired level. Thus-generated pixel drive voltages $G_1$ to $G_n$ are applied to data lines $D_1$ to $D_n$ of the display unit 20.

As illustrated in FIG. 2, during the data scanning period SP in each of the frame display periods in the display unit 20, scanning pulses in synchronization with the respective strobe pulses $SB_1$ to $SB_m$ are sequentially applied to the scan lines $S_1$ to $S_m$ in an alternative way. As a result, a picture corresponding to the pixel drive voltages $G_1$ to $G_n$ is displayed one scan line at a time in order.

Hereinbelow, the operation of the driving device including the above-described drive controller 11 and data driver 13 will be described.

Figure 6:
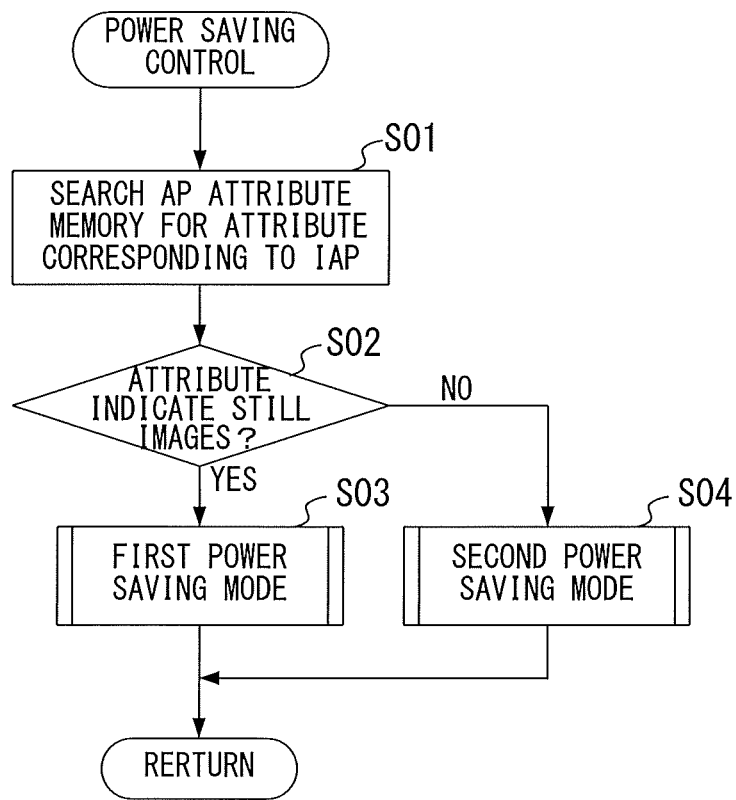
FIG. 6 is a flow chart illustrating a power saving control routine.

The drive controller 11 executes a power saving control routine shown in FIG. 6 each time the AP denoted by the AP identification signal IAP is switched to another AP.

In FIG. 6, first, the drive controller 11 searches the stored contents, shown in FIG. 4, of the AP attribute memory 11a for the attribute of the AP denoted by the AP identification signal IAP (step S01). Then, the drive controller 11 determines whether the attribute of the AP indicates being software providing still images (step S02). If at step S02 it is determined that the attribute of the AP indicates being software providing still images, then the drive controller 11 performs drive control according to the first power saving mode (step S03). If at step S02 it is determined that the attribute of the AP does not indicate being software providing still images, that is, the attribute of the AP indicates being software providing images including moving-image areas, then the drive controller 11 performs drive control according to the second power saving mode (step S04).

Figure 7:
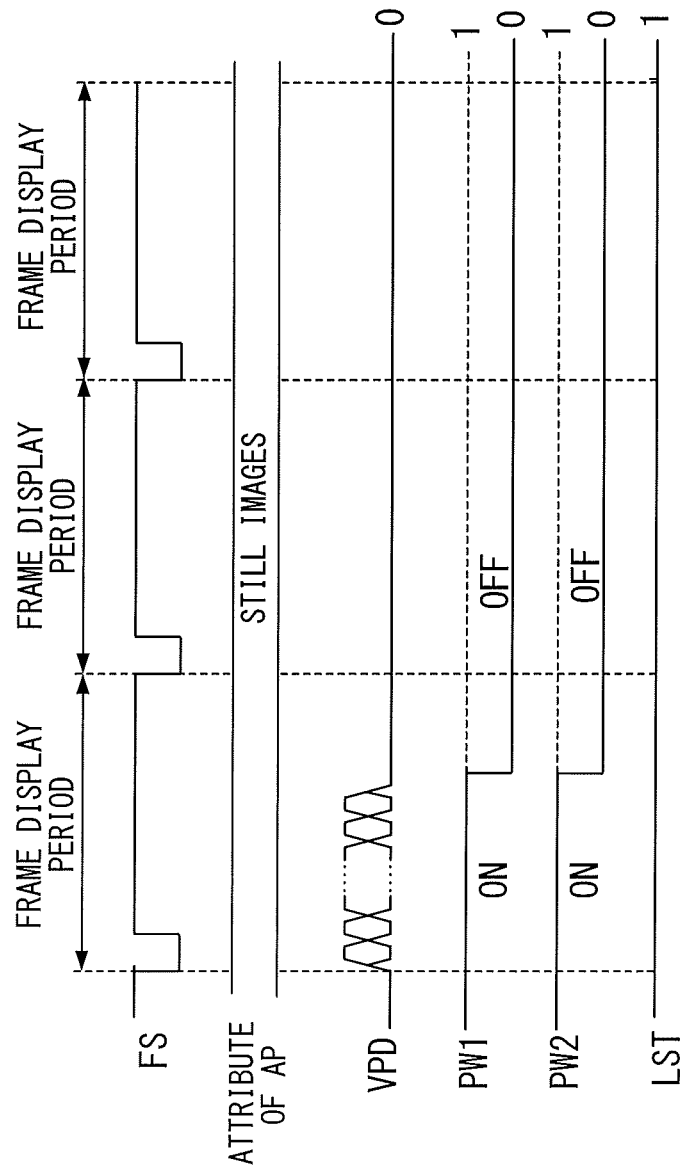
FIG. 7 is a time chart illustrating control in a first power saving mode.

In the first power saving mode, as shown in FIG. 7, after transmitting one frame worth of the pixel data sequence signal VPD denoting a still image to the data driver 13, the drive controller 11 stops transmitting the pixel data sequence signal VPD during the subsequent frame display periods while supplying the power switch signals PW1 and PW2 having, e.g., the logic level of 0 to stop power supply to the data driver 13. When the video data signal VD denoting a new still image is supplied, the drive controller 11 performs the operation shown in FIG. 7 again.

As such, in the first power saving mode, after the data driver 13 drives to display one frame worth of an image, power delivery to the data driver 13 is stopped, and thus power consumption is reduced.

Figure 8:
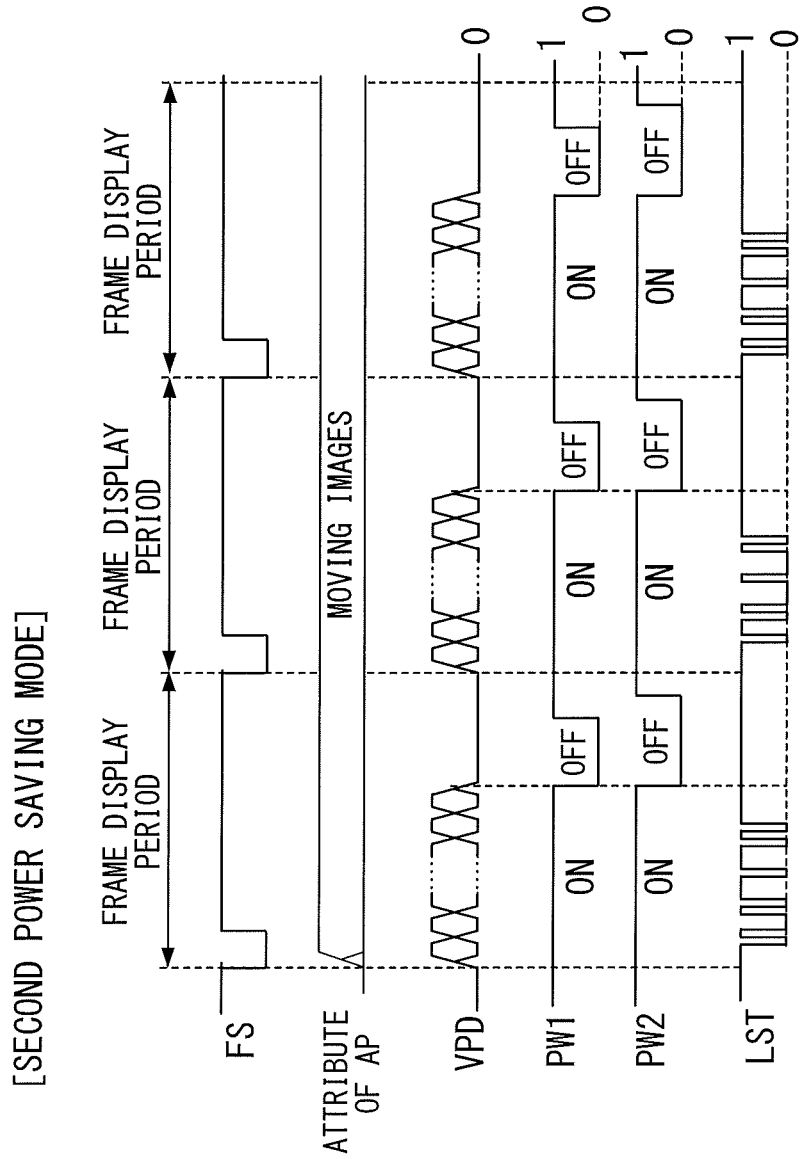
FIG. 8 is a time chart illustrating control in a second power saving mode.

In the second power saving mode, the drive controller 11 performs drive operation shown in FIG. 2 in each frame display period as shown in FIG. 8. In each frame display period, the drive controller 11 generates the import stop signal LST indicating whether to stop importing of the pixel data sequence signal VPD based on the determining result of the line coincidence determining part 11b and supplies to the data driver 13.

Figure 9:
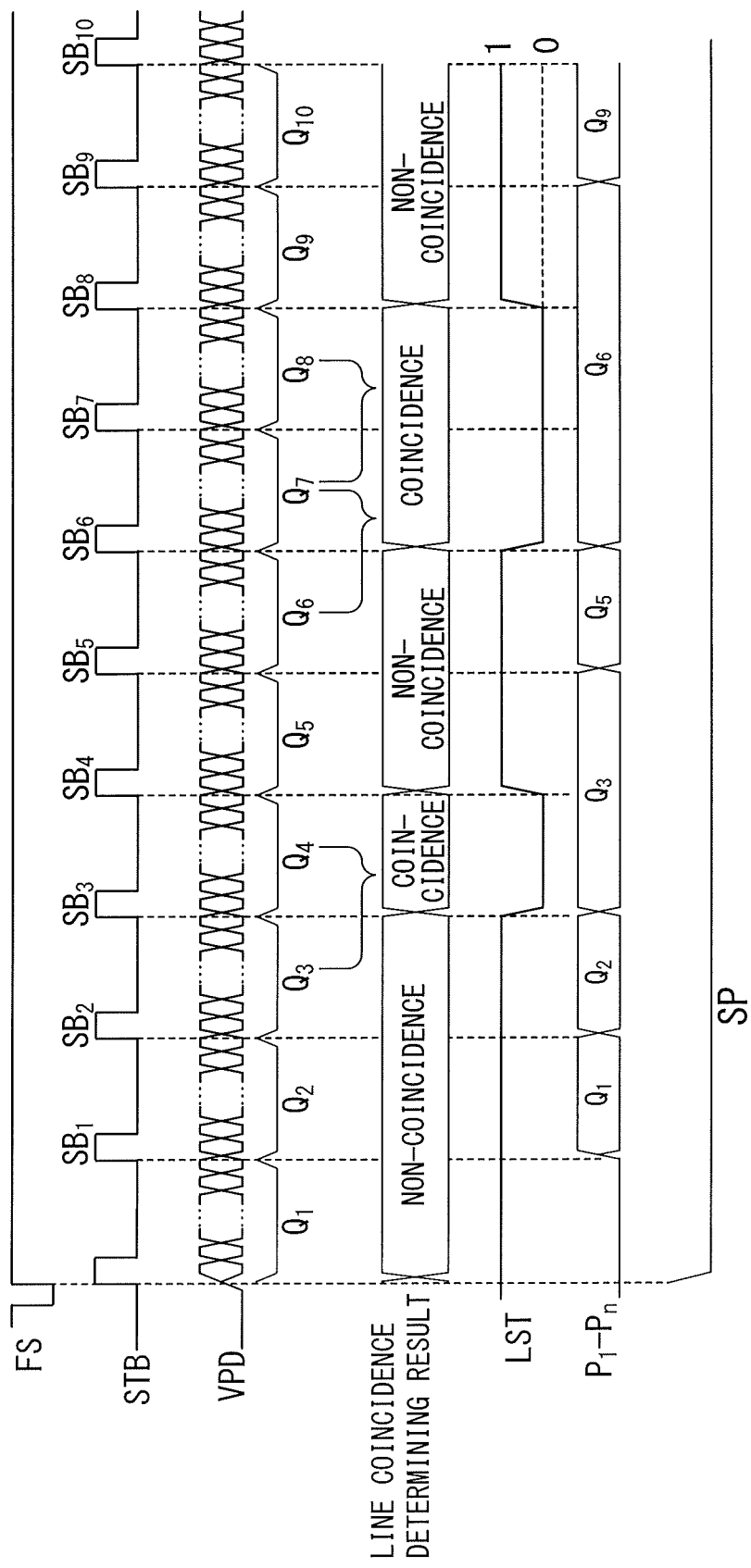
FIG. 9 is a time chart illustrating an example of control during a data scanning period SP in the second power saving mode.

FIG. 9 is a time chart illustrating an example of the import stop signal LST generated by the drive controller 11 in the case where from among the pieces of the 1-H line data Q1 to Q10 corresponding to horizontal scan lines S1 to S10, Q3 and Q4 corresponding to horizontal scan lines S3 and S4 coincide and also Q6 to Q8 corresponding to horizontal scan lines S6 to S8 coincide with each other. As shown in FIG. 9, while the determining result of the line coincidence determining part 11b indicates a non-coincidence, that is, when neighboring pieces of the 1-H line data are different, the drive controller 11 generates the import stop signal LST having, e.g., the logic level of 1 to have it import the pixel data sequence signal VPD. While the determining result of the line coincidence determining part 11b indicates a coincidence, that is, when neighboring pieces of the 1-H line data are the same, the drive controller 11 generates the import stop signal LST having, e.g., the logic level of 0 to have it stop importing of the pixel data sequence signal VPD. Thus, according to the import stop signal LST having the logic level of 1, the shift register 133 of the data driver 13 sequentially imports each of the pixel data PD in the pixel data sequence signal VPD while shifting the imported data and, each time that one horizontal scan line worth of pixel data have been imported, supplies the one horizontal scan line worth of pixel data P1 to Pn to the data latch 134 of the next stage. According to the import stop signal LST having the logic level of 0, the shift register 133 stops importing of the pixel data sequence signal VPD and supplies one horizontal scan line worth of pixel data P1 to Pn imported in the preceding time to the data latch 134 of the next stage again.

As such, in the second power saving mode, while the import stop signal LST having the logic level of 0 is being supplied, the data driver 13 stops importing of the pixel data sequence signal VPD, or specifically the shift register 133 of the data driver 13 stops the above shift operation. Thus, power consumption is reduced accordingly.

As described above, where the AP that is the provider of the video data signal is software providing still images, the driving device according to the present invention reduces power consumption by stopping power delivery to the data driver 13 as shown in FIG. 7 (the first power saving mode). Where the AP that is the provider of the video data signal is software providing images including moving-image areas, the driving device cause the data driver 13 to stop importing of the pixel data sequence signal VPD when the pieces of the 1-H line data's data respectively corresponding to vertically neighboring ones of the horizontal scan lines coincide with each other as shown in FIGS. 8 and 9 (the second power saving mode), thereby reducing power consumption.

To sum up, in the driving device according to the present invention, the drive controller (11) generates the pixel data sequence signal (VPD) formed of a sequence of respective pixel data corresponding to the luminance levels of the pixels in accordance with the video data signal (VD). The data driver (13) imports the pixel data sequence signal and applies the pixel drive voltages (G) corresponding to luminance levels denoted by respective pixel data to the data lines (D1 to Dn) of the display unit (20). During this time, the drive controller determines whether the AP that is the provider of the video data signal is a piece of software providing still images or a piece of software providing moving images (i.e., images including moving-image areas) (S01, S02) and based on the determining result, performs either the first power saving mode or the second power saving mode as follows. In the first power saving mode, power delivery to the data driver is stopped. In the second power saving mode, the data driver stops importing of the pixel data sequence signal when the pieces of the 1-H line data respectively corresponding to neighboring ones of horizontal scan lines of the display unit coincide with each other.

Therefore, according to the present invention, not only when video data is provided by software providing still images, but also when video data provided by software providing images including moving-image areas is supplied, power consumption can be reduced.

Among image-providing software programs, there are programs to display moving images on the center area of a screen and still images on the peripheral area of the screen, programs to display moving images on the right-side (or left-side) area of a screen and still images on the other area, and the like other than ones to display moving images or still images over an entire screen.

Figure 10:
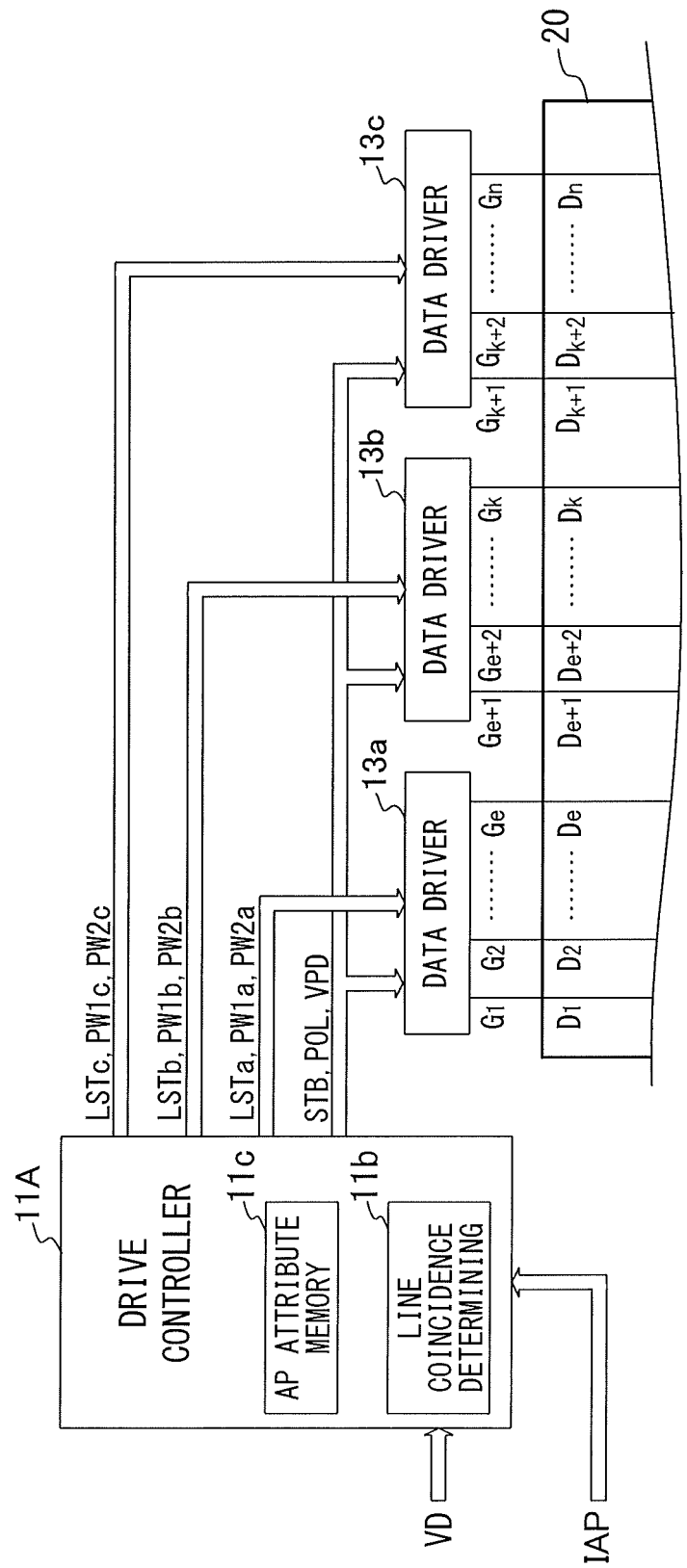
FIG. 10 is a block diagram illustrating another example of the driving device according to the present invention.

FIG. 10 is a block diagram illustrating another example of the driving device configured to deal with such a variety of AP, thereby efficiently reducing power consumption. In the driving device shown in FIG. 10, the data driver 13 shown in FIG. 1 has a configuration where it is divided into a data driver 13a in charge of displaying on the left area LA of the screen SC of the display unit 20 shown in FIG. 11, a data driver 13b in charge of displaying on the center area CA, and a data driver 13c in charge of displaying on the right area RA. In the driving device shown in FIG. 10, a drive controller 11A is adopted instead of the drive controller 11. The drive controller 11A includes an AP attribute memory 11c instead of the AP attribute memory 11a.

The drive controller 11A is the same in operation as the drive controller 11 except for generating import stop signals LSTa to LSTc instead of the import stop signal LST, and power switch signals PW1a to PW1c and PW2a to PW2c instead of the power switch signals PW1 and PW2.

The data drivers 13a to 13c all have the internal configuration shown in FIG. 5. Note that the shift register 133 of the data driver 13a sequentially imports a sequence of pixel data PD respectively corresponding to data lines $D_1$ to $D_e$ (integer e<n) corresponding to the left area LA of the display unit 20 out of the pixel data sequence signal VPD supplied from the drive controller 11A and supplies pixel data $P_1$ to $P_e$ to the data latch 134. Thus, the data driver 13a supplies pixel drive voltages $G_1$ to $G_e$ respectively corresponding to the pixel data $P_1$ to $P_e$ to the data lines $D_1$ to $D_e$ of the display unit 20. The shift register 133 of the data driver 13b imports a sequence of pixel data PD respectively corresponding to data lines $D_{e+1}$ to $D_k$ (e<integer k) corresponding to the center area CA of the display unit 20 out of the pixel data sequence signal VPD supplied from the drive controller 11A and supplies pixel data $P_{e+1}$ to $P_k$ to the data latch 134. Thus, the data driver 13b supplies pixel drive voltages $G_{e+1}$ to $G_k$ respectively corresponding to the pixel data $P_{e+1}$ to $P_k$ to the data lines $D_{e+1}$ to $D_k$ of the display unit 20. The shift register 133 of the data driver 13c imports a sequence of pixel data PD respectively corresponding to data lines $D_{k+1}$ to $D_n$ corresponding to the right area RA of the display unit 20 out of the pixel data sequence signal VPD supplied from the drive controller 11A and supplies pixel data $P_{k+1}$ to $P_n$ to the data latch 134. Thus, the data driver 13c supplies pixel drive voltages $G_{k+1}$ to $G_n$ respectively corresponding to the pixel data $P_{k+1}$ to $P_n$ to the data lines $D_{k+1}$ to $D_n$ of the display unit 20.

In the AP attribute memory 11c, as shown in, e.g., FIG. 12, identification information to identify each AP that can be the provider of the video data signal VD and attribute information indicating, for each of the data drivers 13a to 13c, whether to display still images or moving images on the screen area which the data driver is in charge of are stored in association with each other predetermined. For example, in the example shown in FIG. 12, "AP1" is image-providing software providing a video data signal to have the entire screen SC be a moving-image area. "AP2" is image-providing software providing a video data signal to display moving images on the center area CA of the screen SC and still images on the right area RA and the left area LA. "AP3" is image-providing software providing a video data signal to display moving images on the left area LA of the screen SC and still images on the right area RA and the center area CA.

The drive controller 11A searches the stored contents of the AP attribute memory 11c shown in FIG. 12 for the respective attributes for the data drivers 13a to 13c corresponding to the AP identified by the AP identification signal IAP. For one of the data drivers 13a to 13c whose attribute indicates still-image displaying, the drive controller 11A supplies the pixel data sequence signal VPD, the import stop signal LST, the power switch signals PW1 and PW2 to have it drive in the first power saving mode shown in FIG. 7 to the data driver. For a data driver whose attribute indicates moving-image displaying, the drive controller 11A supplies the pixel data sequence signal VPD, the import stop signal LST, the power switch signals PW1 and PW2 to have it drive in the second power saving mode shown in FIG. 8 to the data driver. For example, if the AP identified by the AP identification signal IAP is AP2 shown in FIG. 12, the drive controller 11A supplies the pixel data sequence signal VPD, the import stop signal LSTa, the power switch signals PW1a and PW2a to have it drive in the first power saving mode shown in FIG. 7 to the data driver 13a. And the drive controller 11A supplies the pixel data sequence signal VPD, the import stop signal LSTb, the power switch signals PW1b and PW2b to have it drive in the second power saving mode shown in FIG. 8 to the data driver 13b and supplies the pixel data sequence signal VPD, the import stop signal LSTc, the power switch signals PW1c and PW2c to have it drive in the first power saving mode shown in FIG. 7 to the data driver 13c.

By this means, the driving device can efficiently reduce power consumption while dealing with the intrinsic display form, that is, the display form (moving image/still image) of each area (LA, CA, RA) in the screen SC of the display unit 20 of each AP that can be the provider of the video data signal.

Figure 11:
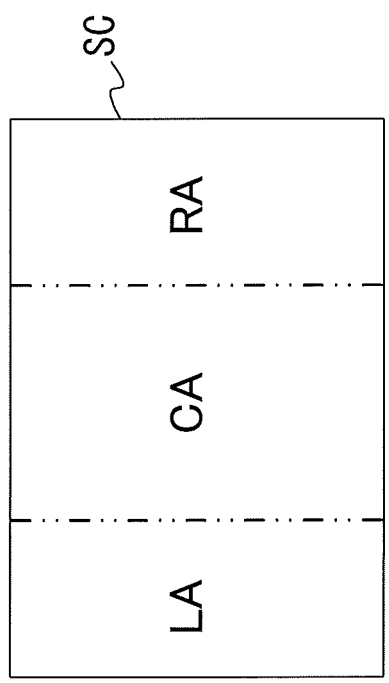
FIG. 11 is a diagram illustrating area division in the screen SC of a display unit 20.

Although in the example shown in FIGS. 10 to 12 the data driver 13 has a configuration where it is divided into the data drivers 13a to 13c in charge of displaying images on the three areas (LA, CA, RA) in the screen SC of the display unit 20, the number of parts into which the data driver 13 is divided should be two or greater.

To sum up, the data driver (13) should have a configuration where it is divided into a first data driver in charge of displaying images on a first area in the screen (SC) of the display unit (20) and a second data driver in charge of displaying images on a second area other than the first area in the screen. Where the application software is software to display moving images on the first area and still images on the second area, the drive controller (11) performs the second power saving mode (FIG. 8) for the first data driver and the first power saving mode (FIG. 7) for the second data driver.

This application is based on a Japanese Patent application No. 2013-241071 which is hereby incorporated by reference.

What is claimed is:

1. A driving device for driving a display unit, to thereby cause the display unit to display a sequence of images corresponding to a video data signal, the displaying unit having m horizontal scan lines and n data lines, m and n each being an integer larger than 1, the driving device comprising:
a drive controller configured to generate a pixel data sequence signal that corresponds to luminance levels of pixels of the sequence of images, and that includes a series of frame data pieces, each frame data piece including m pieces of line data respectively corresponding to the m horizontal scan lines; and
a data driver configured to import the pixel data sequence signal, and to apply, to the n data lines, pixel drive voltages corresponding to the luminance levels denoted by the pixel data sequence signal,
wherein the drive controller is configured
to determine whether the video data signal is provided by a still-image provider or by a moving-image provider,
upon determining that the video data signal is provided by a still-image provider, to cause the data driver to operate in a first power saving mode in which power supply to the data driver is stopped, and
upon determining that the video data signal is provided by a moving-image provider, to cause the data driver to operate in a second power saving mode, in which the data driver stops importing the pixel data sequence signal in response to coincidence of two neighboring pieces of the line data that correspond to two neighboring ones of the m horizontal scan lines.

2. A driving device for driving a display unit according to claim 1, wherein in the first power saving mode, after transmitting one frame worth of the pixel data sequence signal to the data driver, the drive controller stops transmitting the pixel data sequence signal to the data driver.

3. A driving device for driving a display unit according to claim 1, further comprising a power switch that supplies a source voltage to the data driver,
wherein the drive controller causes the power switch to stop supplying the source voltage to the data driver in the first power saving mode.

4. A driving device for driving a display unit that has
a screen that is dividable into a plurality of displaying areas, and
m horizontal scan lines and n data lines, m and n each being an integer larger than 1,
to thereby display a sequence of images corresponding to a video data signal from a provider, the sequence of images being dividable into a plurality of sequences of image portions, each image portion sequence being a still-image portion sequence or a moving-image portion sequence, the provider having a displaying attribute associated thereto for displaying one of the still-image portion sequence and the moving-image portion sequence in each of the displaying areas, the driving device comprising:
a drive controller configured to generate a pixel data sequence signal that corresponds to luminance levels of pixels of the sequence of images, and that includes a series of frame data pieces, each frame data piece including m pieces of line data respectively corresponding to the m horizontal scan lines; and
a plurality of data drivers, each configured to import the pixel data sequence signal, and to apply, respectively to a different subset of the n data lines, pixel drive voltages corresponding to the luminance levels denoted by the pixel data sequence signal, wherein
the drive controller is configured
to determine the displaying attribute of the provider, and
to cause each of the data drivers to operate in
a first power saving mode in which power supply to said each data driver is stopped, or
a second power saving mode, in which said each data driver stops importing the pixel data sequence signal in response to coincidence of two neighboring pieces of the line data that correspond to two neighboring ones of the m horizontal scan lines,
respectively in accordance with whether the still-image portion sequence or the moving-image portion sequence is displayed in the displaying area corresponding to the subset of the data lines of said each data driver, as indicated by the displaying attribute.

5. A driving device for driving a display unit according to claim 4, wherein, in the first power saving mode of each data driver, after transmitting one frame worth of the pixel data sequence signal to the data driver, the drive controller stops transmitting the pixel data sequence signal to the data driver.

6. A driving device for driving a display unit according to claim 4, wherein the plurality of displaying areas include two areas arranged left and right to each other.

7. A driving device for driving a display unit according to claim 5, wherein the plurality of displaying areas include two areas arranged left and right to each other.

8. A driving device for driving a display unit according to claim 4, wherein
in the still-image portion sequence, any two neighboring image portions are substantially identical to each other, and
in the moving-image portion sequence, no neighboring image portions are substantially identical to each other.

* * * * *